US008890881B2

(12) United States Patent
Shin et al.

(10) Patent No.: US 8,890,881 B2
(45) Date of Patent: Nov. 18, 2014

(54) MAPPING METHOD AND VIDEO SYSTEM FOR MAPPING PIXEL DATA INCLUDED IN THE SAME PIXEL GROUP TO THE SAME BANK OF MEMORY

(75) Inventors: Jong-chul Shin, Suwon-si (KR); Kee-won Joe, Yongin-si (KR); Sang-jun Yang, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 1864 days.

(21) Appl. No.: 11/843,206

(22) Filed: Aug. 22, 2007

(65) Prior Publication Data

US 2008/0055328 A1   Mar. 6, 2008

(30) Foreign Application Priority Data

Aug. 30, 2006   (KR) ........................ 10-2006-0082916

(51) Int. Cl.
*G09G 5/399* (2006.01)
*G06F 13/00* (2006.01)
*G06F 12/02* (2006.01)
*H04N 7/01* (2006.01)
*H04N 19/426* (2014.01)
*H04N 5/14* (2006.01)

(52) U.S. Cl.
CPC . *H04N 5/14* (2013.01); *H04N 7/01* (2013.01); *H04N 19/0049* (2013.01)
USPC ............................ 345/540; 345/536; 345/544

(58) Field of Classification Search
CPC ......................... C09G 5/239; C09G 2360/123
USPC .................................. 345/530, 536, 540, 544
See application file for complete search history.

(56) References Cited

U.S. PATENT DOCUMENTS

| | | | | |
|---|---|---|---|---|
| 5,794,016 A | * | 8/1998 | Kelleher | 345/505 |
| 5,872,577 A | * | 2/1999 | Perrin | 345/535 |
| 6,118,485 A | * | 9/2000 | Hinoue et al. | 348/373 |
| 6,125,143 A | * | 9/2000 | Suzuki et al. | 375/240.11 |
| 6,125,432 A | * | 9/2000 | Hanami et al. | 711/157 |
| 6,674,442 B1 | * | 1/2004 | Suemitsu et al. | 345/536 |
| 6,778,177 B1 | * | 8/2004 | Furtner | 345/544 |
| 7,126,992 B2 | * | 10/2006 | Chiang et al. | 375/240.24 |

FOREIGN PATENT DOCUMENTS

| | | |
|---|---|---|
| CN | 1199283 | 11/1998 |
| JP | 10-042288 | 2/1998 |
| JP | 11-004443 | 1/1999 |
| JP | 2001-209573 | 8/2001 |
| JP | 2003-186740 | 7/2003 |
| WO | WO 03/069885 | 8/2003 |

OTHER PUBLICATIONS

First Office Action issued in corresponding Chinese Appln. No. 200710147193.3 dated Jul. 6, 2010.

* cited by examiner

*Primary Examiner* — Joni Richer
(74) *Attorney, Agent, or Firm* — F. Chau & Associates, LLC (57) ABSTRACT

Provided are a mapping method and a video system for mapping pixel data included in the same pixel group to the same bank of a memory. A method for mapping the position of pixel data of a picture to an address of a memory comprises a pixel group dividing operation and an address mapping operation. The pixel group dividing operation divides the pixels of the picture into at least one pixel group. The address mapping operation maps pixel data of pixels included in the same pixel group to the same bank of the memory.

30 Claims, 7 Drawing Sheets

| 1 | 2 | 3 | 4 | 1 | 2 |
|---|---|---|---|---|---|
| 2 | 3 | 4 | 1 | 2 | 3 |
| 3 | 4 | 1 | 2 | 3 | 4 |
| 4 | 1 | 2 | 3 | 4 | 1 |

·····

— PIC2

FIG. 4C

| 1 | 2 | 3 | 4 | 1 | 2 |
|---|---|---|---|---|---|
| 3 | 4 | 1 | 2 | 3 | 4 |
| 1 | 2 | 3 | 4 | 1 | 2 |
| 3 | 4 | 1 | 2 | 3 | 4 |

·····

— PIC3

MAPPING METHOD AND VIDEO SYSTEM FOR MAPPING PIXEL DATA INCLUDED IN THE SAME PIXEL GROUP TO THE SAME BANK OF MEMORY

CROSS-REFERENCE TO RELATED PATENT APPLICATION

This application claims the benefit, under 35 U.S.C. 11 g, of Korean Patent Application No. 10-2006-0082916, filed on Aug. 30, 2006, in the Korean Intellectual Property Office, which is incorporated by reference herein in its entirety.

BACKGROUND OF THE INVENTION

1. Field of the Invention

The present invention relates to a mapping method and a video system, and more particularly, to a mapping method and a video system for mapping pixel data of pixels included in the same pixel group to the same bank a a memory.

2. Description of the Related Art

In a video system, pixel data is stored in a memory. To be stored, the pixel data is encoded (e.g., compressed) by an MPEG encoder and mapped to an address in the memory, A MPEG decoder reads and decodes the pixel data stored in the memory. A picture is reconstructed using the decoded pixel data.

SUMMARY OF THE INVENTION

An aspect of the present invention provides a method for mapping pixel data included in the same pixel group (e.g., including a plurality of macroblocks) to the same bank address of a memory.

The present invention also provides a video system for mapping pixel data included in the same pixel group to the same bank address of a memory.

According to an aspect of the present invention, there is provided a method for mapping the position of pixel data of a picture to an address of a memory, which comprises a pixel group dividing operation and an address mapping operation. The pixel group dividing operation divides the pixel data of the picture into at least one pixel group. The address mapping operation maps pixel data included in the same pixel group to the same bank address of the memory.

The address mapping operation may map pixel data included in the same pixel group to the same bank address and the same row address of the memory. The address mapping operation may map pixel data included in neighboring pixel groups to different bank addresses of the memory.

The size of the pixel group may be greater than the size of a macroblock of the picture. The horizontal length or the vertical length of the pixel group may be 2N (N is an integer that is not negative) times the horizontal length or the vertical length of the macroblock of the picture. The size of the pixel data of each pixel group may be smaller than or equal to a page (row) size of the memory. The size of the pixel data of the pixel group may be substantially equal to the page size of the memory.

The mapping method may be used in standardized video processing applications using two-dimensional block transmission type access to a memory. For example, the mapping method may be implemented as a part of a CODEC (encoding/decoding) system frequently using macroblock-based or block-based memory access, such as an H.264, MPEG, DivX or VC-1 compression system. The address mapping operation may map pixel data of a decoded/encoded picture to an address of the memory.

The mapping method may further comprise an arbitrating/controlling operation mapping the pixel data in the address of the memory to which the pixel data is mapped.

According to another aspect of the present invention, there is provided a video system comprising a memory and an address mapper. The memory stores pixel data of the pixels of a picture. The address mapper maps (the position of) the pixel data of the pixels of the picture to an address of the memory. The address mapper divides the pixels of the picture into at least one pixel group and maps pixel data of the pixels included in the same pixel group to the same bank address of the memory.

The video system may further comprise a look-up table. The look-up table may store information indicating a mapped region of the picture. Different mapping methods can be applied to different memory regions corresponding to contents of the look-up table according to the contents of the look-up table. For example, different mapped regions of the picture may have pixel groups having different dimensions and/or macroblocks having different dimensions. The information stored in the look-up table may include the start address and the end address of a region to which the pixel data is mapped or the start address and the size of the region. The look-up table may store the size of the mapped picture, the type of the picture a macroblock size or a page size of the memory. The look-up table may store the information before the address mapper performs the mapping operation. The look-up table may store the information in a register setting manner.

The present invention will now be described more fully with reference to the accompanying drawings, in which exemplary embodiments of the invention are shown. The invention may, however, be embodied in many different forms and should not be construed as being limited to the embodiments set forth herein; rather these embodiments are provided so that this disclosure will be thorough and complete, and will fully convey the concept of the invention to those skilled in the art. Throughout the drawings, like reference numerals refer to like elements.

BRIEF DESCRIPTION OF THE DRAWINGS

The above and other features of the present invention will become more apparent to persons skilled in the art by describing in detail exemplary embodiments thereof with reference to the attached drawings in which.

DETAILED DESCRIPTION OF EXEMPLARY EMBODIMENTS OF THE INVENTION

Figure 1:
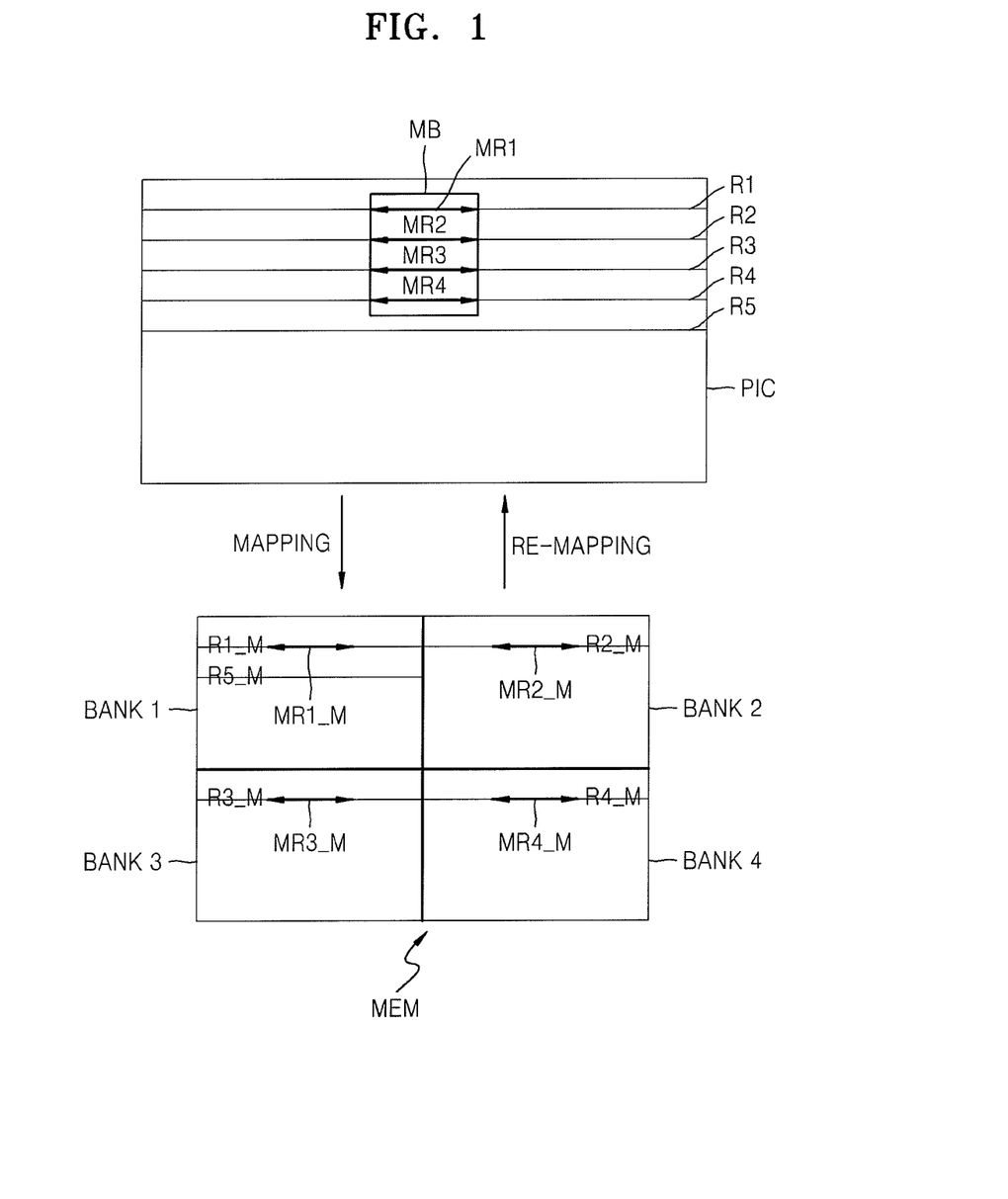
FIG. 1 illustrates a mapping method of a video system for comparison to embodiments of the present invention.

FIG. 1 illustrates a mapping method of a video system for comparison to embodiments of the present invention. Referring to FIG. 1, the video system maps pixel data corresponding to a first single row of pixels of a picture PIC to first continuous addresses of a memory MEM and maps pixel data corresponding to a second row of pixels of the picture PIC to second continuous addresses following the first continuous addresses. If the memory MEM includes a plurality of banks BANK1, BANK2, BANK3 and BANK4, pixel data corresponding to a plurality of scan lines in a picture as large as 1920×1080 is sequentially mapped to the plurality of banks/rows of the memory depending on the data size (size of a row of pixels of the picture PIC) that can be stored in a single row of the memory. For example, if the row size of the memory corresponds to the quantity of pixel data of a single scan line of the picture PIC, pixel data of a first row R1 of the picture PIC is mapped to a first row R1_M of the first bank BANK1 of the memory MEM and pixel data of a second row R2 of the picture PIC is mapped to a first row R2_M of the second bank BANK2 of the memory MEM, etcetera. Thus, pixel data of a third row R3 of the picture PIC is mapped to a first row R3_M of the third bank BANK3 of the memory MEM and pixel data of a fourth row R4 of the picture PIC is mapped to a first row R4_M of the fourth bank BANK4 of the memory MEM. Then, assuming only four banks of memory, pixel data of a fifth row R5 of the picture PIC is mapped to a second row R5_M of the first bank BANK1 of the memory MEM.

An MPEG decoder of the video system of FIG. 1 reads and decodes the picture PIC stored in the memory MEM block by block. Here, a block (macroblock MB) of the picture has a predetermined size. In the video system of FIG. 1 using the above described mapping method, pixel data of a single macroblock MB is mapped to discontinuous addresses of the memory MEM. If the memory MEM includes the plurality of banks BANK1, BANK2, BANK3 and BANK4, the pixel data of a single macroblock MB is mapped to all the plurality of banks BANK1, BANK2, BANK3 and BANK4. For example, if the macroblock MB illustrated in FIG. 1 includes four rows MR1, MR2, MR3 and MR4 of the picture PIC, pixel data corresponding to the four rows MR1, MR2, MRS3 and MR4 is mapped to four partial regions MR1_M, MR2_M, MR3_M and MR4_M of the rows R1, R2, R3 and R4 of the four banks BANk1, BANK2, BANK3 and BANK4 of the memory MEM.

Accordingly, the MPEG decoder of the video system of FIG. 1 must access each of the plurality of memory banks BANK1, BANK2, BANK3 and BANK4 in order to read the pixel data corresponding to a single macroblock. Furthermore, when the row size of the memory is not sufficiently large compared to the size of a single scan line of the picture, the MPEG decoder of the system for comparison to the present invention must frequently access additional rows of each bank when reading a single macroblock. In this case, precharging and activating operations are required whenever the MPEG decoder accesses a row, and thus power consumption of the memory MEM is increased and access times may be increased.

Moreover, in a shared memory system in which a plurality of blocks share a single memory access, it is required that a specific row of a specific bank, which has been opened by a block read, is closed through a precharging operation and a row storing macroblock data is opened through an activating operation. Accordingly, subsequent block reads to access rows after the first access to the macroblock, require precharging and activating operations again. Thus, when the aforementioned mapping method of FIG. 1 is used to access a macroblock, the utilization of the memory is deteriorated.

Figure 2:
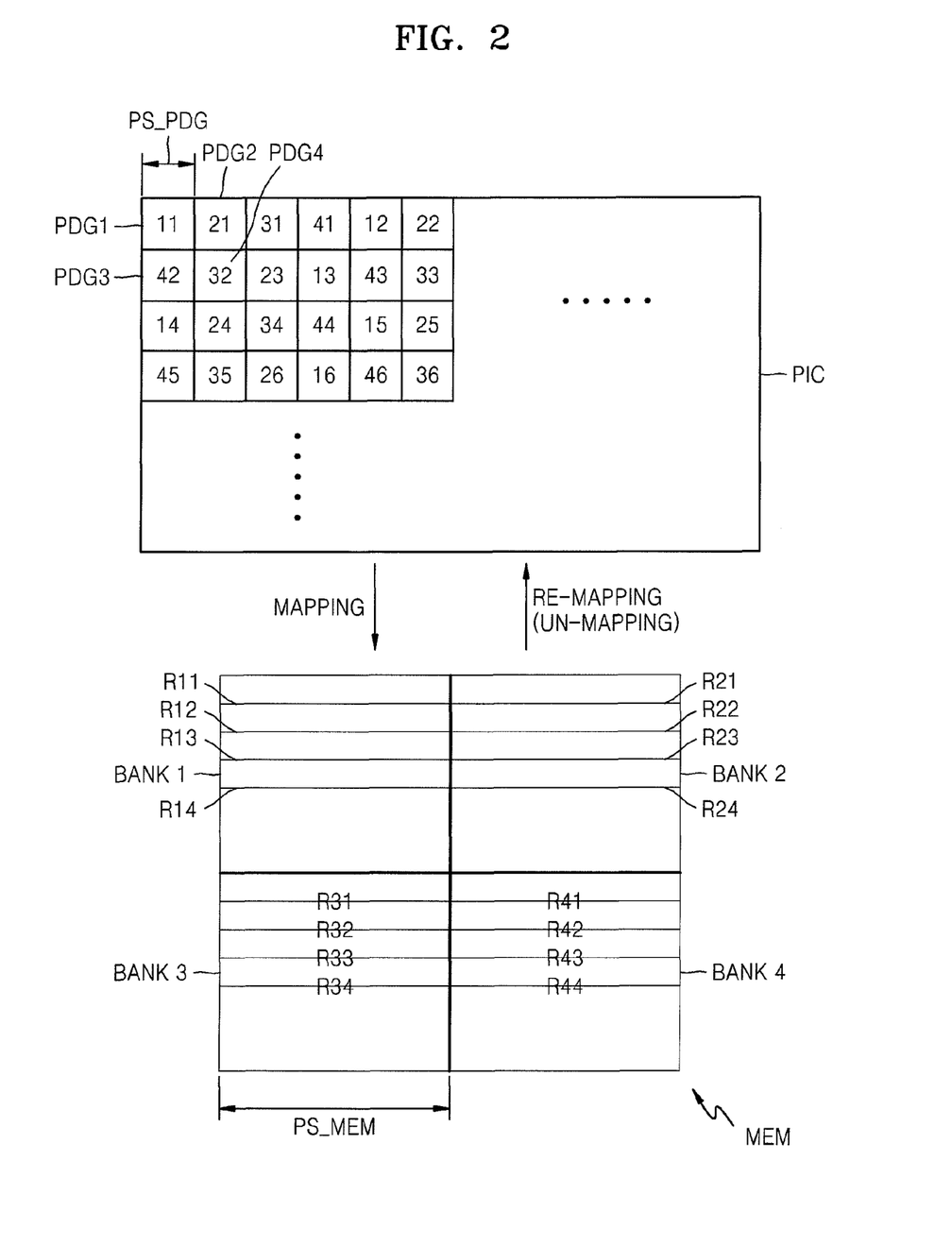
FIG. 2 illustrates a method for mapping pixel data of a whole group of pixels of a picture to an address of a memory according to an embodiment of the present invention.

FIG. 2 illustrates a method for mapping (the position of) pixel data of a whole group of pixels of a picture PIC to an address of a memory MEM according to an embodiment of the present invention. While FIG. 2 illustrates that the memory MEM includes four banks BANK1 BANK2, BANK3 and BANK4, the number of banks included in the memory MEM is not limited thereto. It is assumed that pixel groups 11 through 36 are mapped to memory bank addresses indicated by numbers corresponding to first places of reference numerals of the pixel groups. For example, the pixel groups 11 through 16 are mapped to a first bank BANK1 and pixel groups 21 through 26 are mapped to a second bank BANK2.

Referring to FIG. 2, the mapping method according to an embodiment of the present invention includes a pixel group dividing operation and an address mapping operation. The pixel group dividing operation divides and groups the pixels of the picture PIC into a plurality (e.g., at last one) of pixel groups 11 through 36. The address mapping operation maps pixel data of the pixels included in each pixel group (for example, the pixel group 11) to the same memory bank address (for example, BANK1) of the memory MEM.

The address mapping operation can map the pixel data of pixels included in the same pixel group (for example, the pixel group 11) to the same memory row address (for example, R11) of the same memory bank address (for example, BANK1).

The address mapping operation can map pixel data included in neighboring pixel groups (For example, pixel groups 11 and 21) to different bank addresses (for example, BANK1 and BANK2 respectively) of the memory MEM. For example, the pixel group 23 is mapped to the bank address BANK2 and the pixel groups 31, 32, 13 and 34 (all adjacent to the pixel group 23) are mapped to the bank addresses BANK3 and BANK1.

Figure 4A:
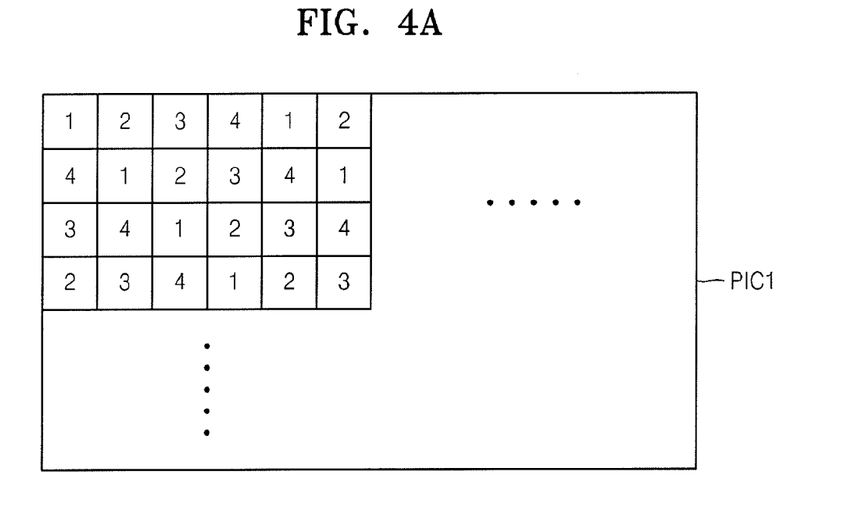
FIGS. 4A 4B and 4C illustrate methods of mapping pixel data of pixels included in neighboring pixel groups to different bank addresses of a memory according to embodiments of the present invention.
Figure 4B:
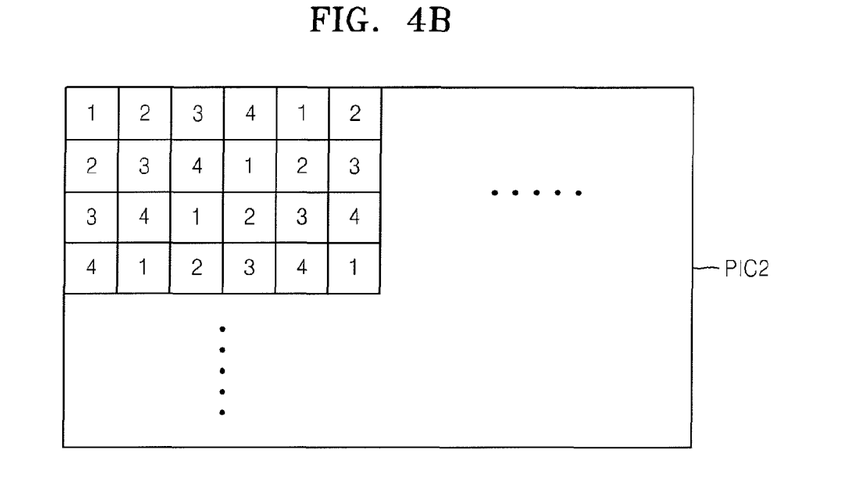
Figure 4C:
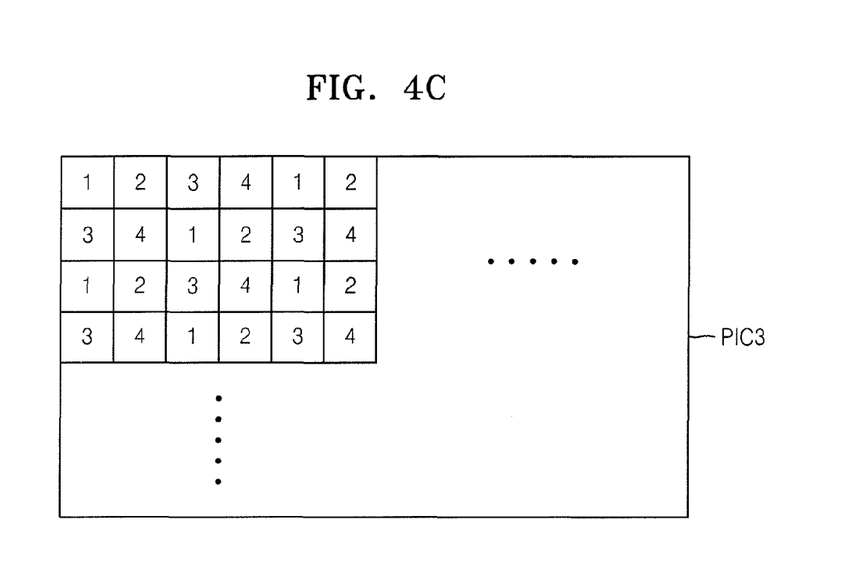

FIGS. 4A, 4B and 4C illustrate methods or patterns for mapping pixel data included in neighboring pixel groups to different memory bank addresses according to three exemplary embodiments of the present invention. Here, numerals 1, 2, 3, and 4 indicate pixel groups respectively corresponding to the four memory banks to which the pixel groups are to be mapped. Those of ordinary skill in the art will be able to map pixel data included in neighboring pixel groups to different bank addresses of a memory in various ways with reference to the exemplary embodiments illustrated in FIGS. 4A, 4B and 4C. Accordingly, it will be understood by those of ordinary skill in the art and to mathematicians that the mapping method according to the present invention is not limited to the exemplary embodiments illustrated in FIGS. 4A, 4B and 4C. Referring back to FIG. 2, it is preferable that the size PS_PDG of each of the pixel groups 11 through 36 is greater than the size of a macroblock of the picture PIC. The horizontal length or the vertical length of each pixel group can be 2N times the horizontal length or the vertical length of the macroblock of the pixel PIC, where N is a natural number Furthermore, the size PS_PDG (e.g., measured in bytes) of the pixel data in each of the pixel groups 11 through 36 can be smaller than or equal to a page size PS_MEM of the memory. Alternatively, the size PS_PDG of the pixel data of each of the pixel groups 11 through 36 can be substantially equal to the page size PS_MEM of the memory.

The mapping method according to embodiments of the present invention can be used in a video CODEC such as an MPEG system or H.264 system. The mapping method may further include a decoding operation. The decoding operation MPEG-decodes or H.264-decodes the picture PIC. In this case, the address mapping operation can map pixel data of the decoded picture to the memory MEM.

The mapping method according to embodiments of the present invention can further include an arbitrating/controlling operation that stores pixel data in an address of the memory MEM to which the pixel data is mapped.

Figure 3:
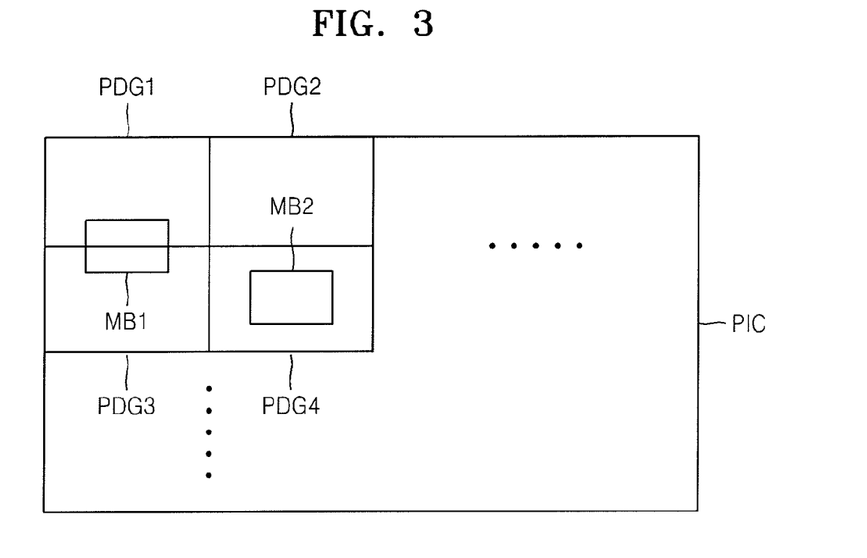
FIG. 3 illustrates the relationship between pixel groups and macroblocks in the mapping method illustrated in FIG. 2.

FIG. 3 illustrates the relationship between pixel groups PDG1, PDG2, PDG3 and PDG4 and macroblocks MB1 and M12 in the mapping method according to an embodiment of the present invention, Referring to FIG. 3, the macroblock MB2 is included in a single pixel group PDG4 while the macroblock MB1 is included in two adjacent pixel groups PDG1 and PDG2. The present invention does not necessarily map pixel data to the banks of a memory in the unit size of a macro block. Instead, the present invention maps pixel data in unit of a pixel group.

Figure 5:
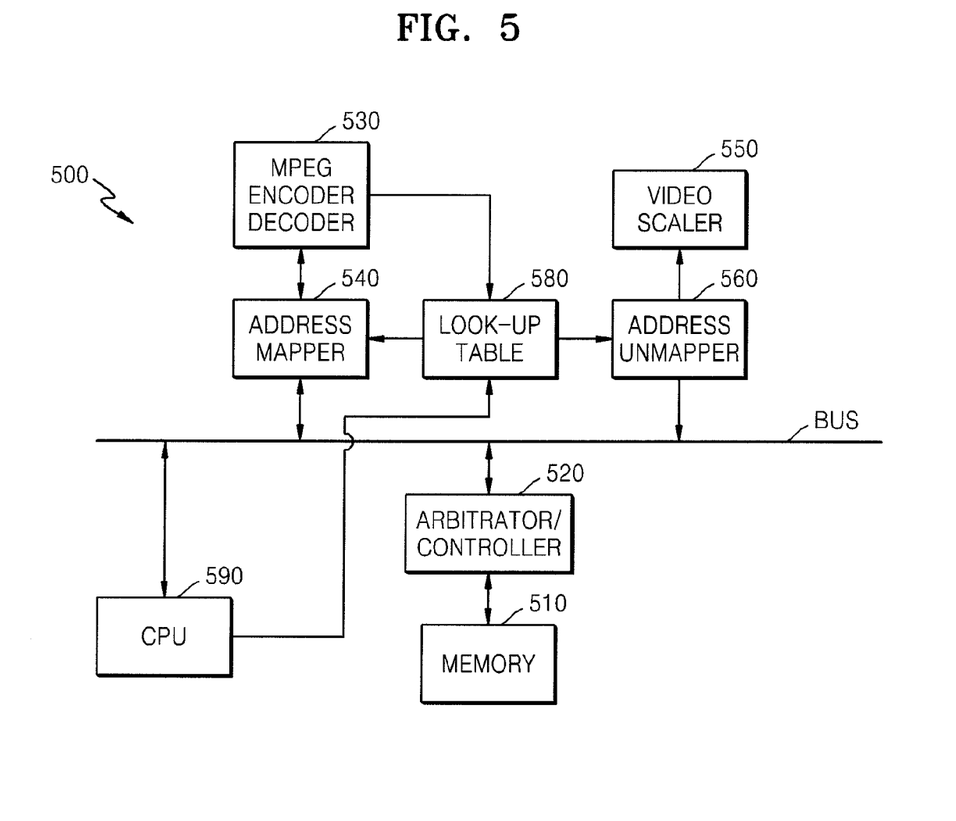
FIG. 5 is a block diagram of a video system according to a first system embodiment of the present invention.

FIG. 5 is a block diagram of a video system 500 according to a first system embodiment of the present invention. FIG. 5 illustrates a CPU 590 and a video scaler 550 in addition to the video system 500 for convenience of explanation. The video scaler 550 controls the size of a decoded picture.

The video system 500 includes a memory 510 and a first address mapper 540. The memory 510 stores pixel data of a picture. The first address mapper 540 maps the position of the pixel data of the picture to an address of the memory 510. The first address mapper 540 divides the pixel data of the picture into at least one pixel group and maps pixel data included in the same pixel group to the same bank address of the memory 510. The first address mapper 540 can map pixel data included in the same pixel group to the same memory row address of the same bank of memory.

The first address mapper 540 can map pixel data included in neighboring pixel groups to different bank addresses of the memory 510. The size of each pixel group can be greater than the size of a macroblock of the picture. The horizontal length or the vertical length of each pixel group can be 2N times the horizontal length or the vertical length of the macroblock of the picture. Furthermore, the size of the pixel data of each pixel group can be smaller than or equal to a page size of the memory. The size of the pixel data of each pixel group can be substantially equal to the page size of the memory.

The technical spirit of the address mapping operation performed by the first address mapper 540 of the video system 500 according to the first system embodiment of the present invention is identical to that of the aforementioned address mapping operation of the mapping method of FIG. 1. Accordingly, those of ordinary skill in the art will understand the address mapping operation performed by the first address mapper 540 of the video system 500 so that detailed explanation thereof is omitted.

The video system 500 can further include a second address mapper (unmapper) 560. The second address mapper 560 re-maps (unmaps) pixel data stored in the memory 510 and transfers the re-mapped (unmapped) pixel data to the video scaler 550. The re-mapping (unmapping) operation of the second address mapper 560 is the opposite (the reverse) of the mapping operation of the first address mapper 540 so that detailed explanation thereof is omitted.

The video system 500 can further include a look-up table 580 that stores information indicating the mapped regions of the picture. The information stored in the look-up table 580 can include the start address and the end address of each region to which pixel data is mapped. Furthermore, the information stored in the look-up table 580 can include the start address and the size of each region to which the pixel data is mapped. Accordingly, the second address mapper 560 can unmap only the regions of the picture that require address unmapping.

The look-up table 580 can store the size of a mapped picture, the type of the mapped picture, the macroblock size and the page size of the memory. The second address mapper 560 can perform an address unmapping operation using the information stored in the look-up table 580. The look-up table 580 can store the information just before the second address mapper 560 carries out the address unmapping operation. Accordingly, the second address mapper 560 can dynamically perform the address unmapping operation. The look-up table 580 can store the information in a register setting manner.

The video system 500 according to the first system embodiment of the present invention can further include a video encoder/decoder 530 for video encoding and decoding the pixel data stored in the memory 510. The video encoder/decoder 530 decodes a picture and transfers the decoded picture to the second address mapper (unmapper) 560. The video system 500 can be an MPEG system or an H.264 system. The video system 500 can alternatively an H.264 video encoder/decoder (not shown) that decodes a picture and transfers the decoded picture to the second address mapper (unmapper) 560. The video system 500 can further include an arbitrator/controller 520 that stores pixel data output from the second address mapper (unmapper) 560 into mapped addresses of the memory 510. The memory 510 can be a dynamic random access memory (DRAM).

Figure 6:
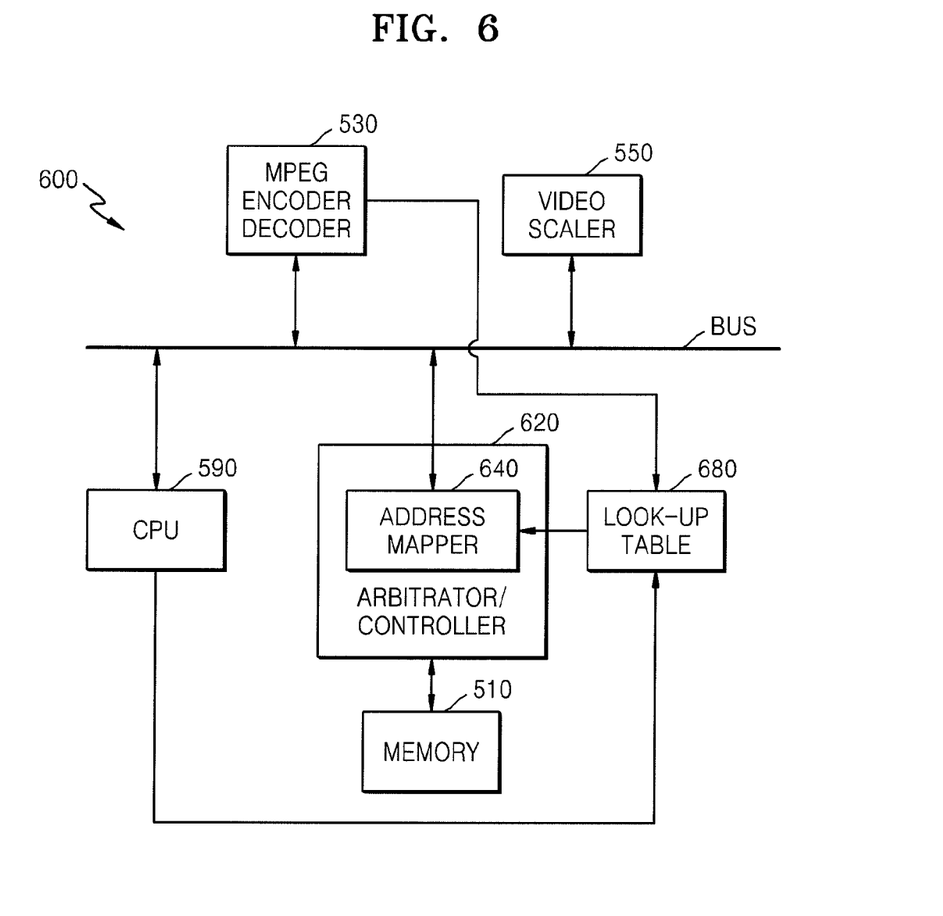
FIG. 6 is a block diagram of a video system according to a second system embodiment of the present invention.

FIG. 6 is a block diagram of a video system 600 according to a second system embodiment of the present invention.

Figure 7:
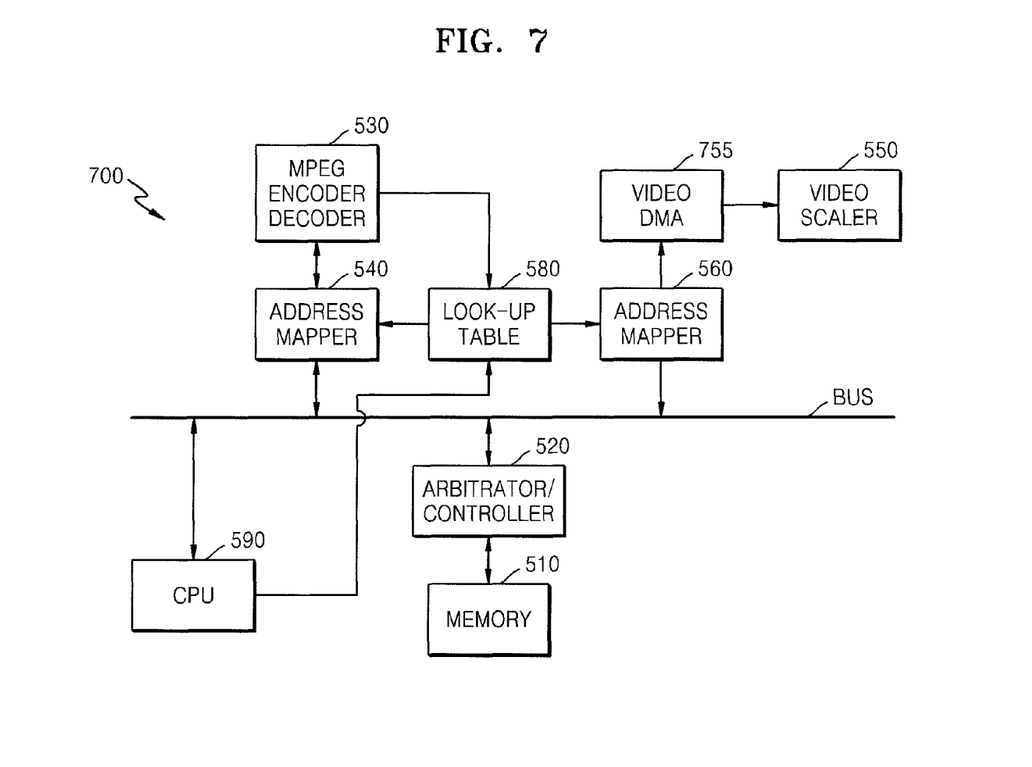
FIG. 7 is a block diagram of a video system according to a third system embodiment of the present invention.

FIG. 7 is a block diagram of a video system 700 according to a third system embodiment of the present invention.

Only the elements of the video system 600 and the video system 700 other than elements the same as those of the video system 500 according to the first system embodiment of the present invention will now be explained in detail.

Referring to FIG. 6, the video system 600 according to the second system embodiment of the present invention includes an address mapper 640 located in an arbitrator/controller 620. The address mapper 640 can be shared by a video encoder/decoder 530, a video scaler 650 and a CPU 590.

Referring to FIG. 7, the video system 700 according to the third system embodiment of the present invention can further include a video direct memory access (DMA) 755. The video DMA 755 controls an operating speed difference between an address unmapper 560 and a video scaler 550.

As described above, the mapping method and the video system according to embodiments of the present invention can continuously access the data of macroblocks by mapping pixel data of pixels included within the same pixel group to the same bank address of a memory.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A video encoding method for encoding pixel data of an frame including H columns of pixels in the horizontal direction and V rows of pixels in the vertical direction, to a memory having B memory banks, (wherein H, V, h1, h2, v1, v2, and B are natural numbers, and B is at least 4) comprising:

if a difference exists between the value of a first image-encoding property of a first image region to be encoded and the value of a first image-encoding property of a second image region to be encoded, dividing the H×V pixels of the frame into a first image region and second image region based on the difference;

grouping the pixels in the first image region of the frame into a first plurality of pixel groups, each pixel group of the first plurality of pixel groups being a block of h1 adjacent columns of pixels in the horizontal direction and v1 adjacent rows of pixels in the vertical direction;

grouping the pixels in the second image region of the frame into a second plurality of pixel groups, each pixel group of the second plurality of pixel groups being a block of h2 adjacent columns of pixels in the horizontal direction and v2 adjacent rows of pixels in the vertical direction;

mapping the pixel data of all of the h1×v1 pixels of the first pixel group of the first plurality of pixel groups to one row address in a first memory region of the first bank among the B banks of the memory;

mapping the pixel data of all of the h1×v1 pixels of the second pixel group of the first plurality of pixel groups to one row address in a first memory region of the second bank among the B banks of the memory;

mapping the pixel data of all of the h1×v1 pixels of the third pixel group of the first plurality of pixel groups to one row address of in a first memory region of the third bank among the B banks of the memory; and mapping the pixel data of all of the h1×v1 pixels of the fourth pixel group of the first plurality of pixel groups to one row address in a first memory region of the fourth bank among the B banks of the memory;

storing information indicating the first and second image regions of the frame in a look-up table;

storing in the look-up table the start row address of each of the first memory regions to which pixel data of the first image region are mapped; and storing in the look-up table the first image-encoding property of the first image region for encoding of the first image region;

storing in the look-up table the start address of the memory at which pixel data of the second image region is stored;

storing in the look-up table the first image-encoding property of the second image region for encoding of the second image region, wherein if a difference exists between the value of a first image-encoding property of a first image region to be encoded and the value of a first image-encoding property of a second image region to be encoded, then h1≠h2 and v1≠v2.

2. The method of claim 1, wherein the mapping of the pixel data comprises mapping pixel data of all the pixels of each pixel group adjacent to a given pixel group to bank addresses of the memory different from the bank address of the given pixel group.

3. The method of claim 1, wherein at least one pixel group from among the second through nth (n is a natural number) pixel groups is adjacent to the first pixel group in the frame.

4. The method of claim 3, wherein all of the second through nth pixel groups are adjacent to the first pixel group in the frame.

5. The method of claim 1, wherein the first image-encoding property of an image region is the size of the macroblock to be used for encoding of that image region, and wherein the size of each pixel group is greater than the size of a macroblock of that image region.

6. The method of claim 5, wherein the horizontal length h1 of each pixel group is $2^{N1}$ times the horizontal length of the macroblock of the first image region and the vertical length v2 of each pixel group is $2^{N2}$ times the vertical length of the macroblock of the first image region (wherein N1 and N2 are natural numbers) and wherein at least one of N1 and N2 is greater than 0.

7. The method of claim 1, wherein the size of the pixel data of each pixel group is smaller than or equal to the page size of the memory.

8. The method of claim 7, wherein the size of the pixel data of each pixel group is equal to the page size of the memory.

9. The method of claim 1, wherein the method is performed in a system including at least one of a video encoder and a video decoder configured to access pixel data of the pixel groups from the B memory banks, and configured to use the first image-encoding property of the first image region or encoding of the first image region, and configured to use the first image-encoding property of the second image region for encoding of the second image region.

10. The method of claim 9, wherein the system is at least one of an MPEG system or an H.264 system and wherein the mapping of the pixel data comprises MPEG-encoding or H.264-encoding the pixel data and then tmpping the encoded pixel data of the frame.

11. The method of claim 1, further comprising MPEG-encoding or H.264-encoding the frame, and wherein the mapping of the pixel data comprises MPEG-encoding or H.264-encoding the pixel data and then mapping the encoded pixel data of the frame.

12. A video system comprising:

a memory comprising a plurality B (wherein B is a natural number equal to or greater than 4) of memory banks and configured to store pixel data of the pixels of a frame; and an address mapper configured to map pixel data of pixels within a first image region of the frame to first addresses in the memory, wherein if a difference exists between the value of a first image-encoding property of the first image region to be encoded and the value of a first image-encoding property of a second image region to be encoded, the address mapper divides the H×V pixels of the frame into a first image region and second image region based on the difference, and maps pixel data of pixels within the second image region of the frame to second addresses in the memory, wherein the address mapper is configured to group the pixels within the first image region of the frame into at least B pixel blocks having horizontal length less than the width of an entire row of pixels of the frame and greater than the width of a macroblock of the first image region, and to map the pixel data of all the pixels of the first pixel block to one row address of the first bank of the memory, map the pixel data of all the pixels of the second pixel block to one row address of the second bank of the memory, map the pixel data of all the pixels of the third pixel block to one row address of the third bank of the memory, and map the pixel data of all the pixels of the fourth pixel block to one row address of the fourth bank of the memory, wherein if a difference exists between the value of a first image-encoding property of the first image region to be encoded and the value of a first image-encoding property of the second image region to be encoded, then the pixel block of the first image region have deterrent dimensions than the pixel blocks of the second image region.

13. The video system of claim 12, further comprising a look-up table configured to store information indicating the mapped image region of the frame.

14. The video system of claim 12, further comprising a look-up table configured to store information before the address mapper performs the mapping operation.

15. The video system of claim 14, wherein the information stored in the look-up table includes:
the start address and the end address of a memory region to which the pixel data is mapped; or
the start address and the size of the memory region.

16. The video system of claim 12, further comprising a look-up table configured to store at least one of the size of the mapped frame, the type of the image in the frame, the size of the macroblock of the frame, and the page size of the memory.

17. The video system of claim 12, wherein the address mapper maps pixel data of pixels included in neighboring pixel blocks within the image region of the frame to different banks of the memory.

18. The video system of claim 12, wherein:
the address mapper maps pixel data of pixels included in a second pixel block to a second bank of the memory, wherein the second pixel block is adjacent to the first pixel block in the frame;
the address mapper maps pixel data of pixels included in a third pixel block to a third bank of the memory, wherein the third pixel block is adjacent to the first pixel block in the frame; and
the address mapper maps pixel data of pixels included in a fourth pixel block to a fourth bank of the memory, wherein the fourth pixel block is adjacent to the first pixel block in the frame.

19. The video system of claim 18, wherein the address mapper maps pixel data of pixels included in a fifth pixel block to the first bank of the memory, wherein the fifth pixel block is adjacent to the first pixel block in the frame.

20. The video system of claim 18, wherein the address mapper maps all pixel data of the pixels of a fifth pixel block to the second bank of the memory, wherein the fifth pixel block is adjacent to the first pixel block in the frame.

21. The video system of claim 12, wherein the size of each pixel block is greater than the size of a macroblock of the frame.

22. The video system of claim 21, wherein the horizontal length of each pixel block is $2^{N1}$ times the horizontal length of the macroblock of the frame and the vertical length of each pixel block is $2^{N2}$ times the vertical length of the macroblock of the frame, (wherein N1 and N2 are natural numbers) and wherein at least one of N1 and N2 is greater than 0.

23. The video system of claim 12, wherein the size of the pixel data of each pixel block is smaller than the page size of the memory.

24. The video system of claim 12, wherein the size of the pixel data of each pixel block is equal to the page size of the memory.

25. The video system of claim 12, further comprising an encoder/decoder configured to encode/decode the pixel data stored in the memory.

26. The video system of claim 12, wherein the video system is at least one of an MPEG system or an H.264 system.

27. The video system of claim 12, further comprising at least one of an MPEG encoder or an H.264 encoder configured to encode the pixel data of the frame and to transfer the encoded pixel data to the address mapper.

28. The video system of claim 12, wherein the memory is a dynamic random access memory (DRAM).

29. An image processing system comprising:
a memory comprising a plurality of B memory banks and configured to store pixel data of the pixels of a frame; and
an address mapper configured to group the pixels in a first image region of the frame into a plurality of at least B rectangular pixel blocks having horizontal length less than the width of an entire row of pixels of the frame and greater than the width of a macroblock of the first image region and to:
map all the pixel data of the pixels of the first pixel block to one row address of the first bank of the memory;
map all the pixel data of the pixels of the second pixel block to one row address of the second bank of the memory;
map all the pixel data of the pixels of the third pixel block to one row address of the third bank of the memory, and
map all the pixel data of the pixels of the fourth pixel block to one row address of the fourth bank of the memory
wherein if a difference exists between the value of a first image-encoding property of the first image region to be encoded and the value of a first image-encoding property of a second image region to be encoded, the address mapper divides the pixels of the frame into a first image region and second image region based on the difference, and groups the pixels in a second image region of the frame into a plurality of at least B rectangular pixel blocks having different dimensions than the pixel blocks of the first image region, and maps pixel data of pixels within the second image region of the frame to second addresses in the memory.

30. The image processing system of claim 29, further comprising an address unmapper configured to select the pixel data of pixels stored in the first bank of the memory and to output the selected pixel data of pixels of the frame.

* * * * *